United States Patent [19]
Choi et al.

[11] Patent Number: 5,702,871
[45] Date of Patent: Dec. 30, 1997

[54] LIQUID CRYSTAL DISPLAY WITH LOW RESISTANCE ELECTRODE AND METHOD THEREFOR

[75] Inventors: Sung-lim Choi; Kwang-jin An, both of Kyunggi-do, Rep. of Korea

[73] Assignee: Samsung Display Devices Co., Ltd., Kyunggi-Do, Rep. of Korea

[21] Appl. No.: 766,104

[22] Filed: Dec. 16, 1996

Related U.S. Application Data

[63] Continuation of Ser. No. 269,490, Jul. 1, 1994, abandoned.

[30] Foreign Application Priority Data

Oct. 23, 1993 [KR] Rep. of Korea ............... 1993-21891

[51] Int. Cl.⁶ .................. G03F 7/40; G02F 1/155
[52] U.S. Cl. ........................................... 430/314
[58] Field of Search .................................. 430/314

[56] References Cited

U.S. PATENT DOCUMENTS

| | | | |
|---|---|---|---|
| 4,586,988 | 5/1986 | Nath et al. | 204/15 |
| 4,666,078 | 5/1987 | Ohno | 228/124 |
| 4,726,965 | 2/1988 | Zondler | 427/98 |
| 4,810,620 | 3/1989 | Takiar et al. | 430/314 |
| 5,261,156 | 11/1993 | Mase et al. | 29/832 |
| 5,342,477 | 8/1994 | Cathey | 216/23 |

*Primary Examiner*—Cynthia Hamilton
*Attorney, Agent, or Firm*—Christie, Parker & Hale, LLP

[57] ABSTRACT

The present invention relates to a super twisted nematic liquid crystal display capable of forming plating layers composed of Ni, Ni+Al or Ni, Ni+Au using electroless plating on both sides of the indium tin oxide electrode. The liquid crystal display with a low resistance electrode includes an indium tin oxide transparent electrode formed on a glass substrate at a predetermined distance from one another, and first and second metal layers formed on both sides of the ITO transparent electrode. As a result, line resistance by line voltage drop of the transparent electrode can be reduced to obtain the uniform picture quality.

12 Claims, 2 Drawing Sheets ered by less consumption of power. So, the LCD has been widely used as an alternative to cathode ray tubes in display monitors for vehicles or in the screens color of televisions as well as in the display monitor for lap top personal computers or pocket computers.

LIQUID CRYSTAL DISPLAY WITH LOW RESISTANCE ELECTRODE AND METHOD THEREFOR

CROSS-REFERENCE TO RELATED APPLICATION

This is a continuation of application No. 08/269,490, filed Jul. 1, 1994 now abandoned.

BACKGROUND OF THE INVENTION

(1) Field of the Invention

The present invention relates to a super twisted nematic liquid crystal display, more particularly, to the liquid crystal display capable of overcoming poor picture quality due to the voltage difference between both ends of the transparent electrode by forming plating layers composed of Ni, Ni+Al or Ni, Ni+Au using electroless plating on both sides of an indium tin oxide (ITO) electrode.

(2) Description of the Related Art

Recently, because office automated machines or portable small size televisions are widely used, studies on liquid crystal display (LCD), electroluminescence (EL) device, plasma display panel (PDP), vacuum fluorescent display (VFD) and the like have been vigorously carried out in place of a cathode ray tube as a display apparatus, and a part of them is under utilization.

Among them, the LCD has a thin thickness, a low weight and is low in price. This display is a good match for the integrated circuit, which is also driven by less consumption of power. So, the LCD has been widely used as an alternative to cathode ray tubes in display monitors for vehicles or in the screens color of televisions as well as in the display monitor for lap top personal computers or pocket computers.

This LCD is formed by injecting liquid crystal between two sheets of conductive panels disposed in parallel which can display characters, numerals and intended designs using the electro-optic effects.

By using such characteristics, material having the dielectric anisotropy is oriented on the electric field and the pictures are displayed. The same has a structure that cholesteric liquid crystal or nematic liquid crystal is injected in a liquid crystal cell made by sealing a sealant on the surroundings of the upper and lower glass substrate where a transparent electrode and an orientational layer are deposited thereon.

When applying voltage to the transparent electrodes formed on the upper and lower glass substrate, the electric field is formed therebetween, so that the liquid crystal received therebetween is twisted in the desired direction on the orientational layer due to the dielectric anisotropical characteristics to deflect light from the external into the axial direction of liquid crystal molecules. As a result, a part where liquid crystal is twisted on the display region shows the optical transmittance different from that where liquid crystal is not, thereby making the display of pictures possible.

Referring to FIGS. 1 (A) and 1 (B), the ITO pattern structure of the liquid crystal display will be explained. FIGS. 1 (A) and 1 (B) show a plane figure and a sectional view, respectively. Referring to the above-mentioned views, an ITO transparent electrode on a glass substrate in the related LCD art, having a relatively high line resistance has been used. Namely, when voltage from an external module is applied to the ITO pattern, the liquid crystal is twisted. The normal ITO pattern has a 18 cm length, 0.2 micrometer thickness and 270 micrometer width in the case of 640×480 dot. Therefore, the voltage difference between both ends of electrode causes the poor picture quality. Moreover, when the driving IC is mounted on only one side, in the case of the large LCD, the transparent electrode must be thin and long, so that a difference of voltage thereof occurs between the voltage applying side (driver IC side) of the LCD panel and the opposite side thereof. Namely, in the case of using only the ITO transparent electrode 10, the line resistance of ITO itself is to be 10 to 30 ohms, resulting in the line voltage drop. This voltage drop results in a change in the picture quality between both sides of the display region, resulting in the poor picture quality.

SUMMARY OF THE INVENTION

An object of the present invention is to provide a liquid crystal display capable of obtaining the uniform display quality and the compact liquid display crystal by preventing voltage difference due to line voltage drop between both ends of a transparent electrode.

To achieve the above-described objective, there is provided a liquid crystal display, including an ITO transparent electrode formed on a glass substrate at a predetermined distance from one another, and first and second metal layers formed on both sides of the ITO transparent electrode.

A method for the liquid crystal display comprises the steps of:

photoresist coating on the whole glass substrate having an ITO layer thereon, exposing, by using a chromium mask, developing and patterning to separate the photoresist region at a predetermined distance from one another;

forming the ITO layer to have the same pattern with the photoresist region by using the ITO etchant;

forming first and second metal layers on both sides of the ITO layer by first and second electroless plating on the substrate to form the pattern thereon; and removing the photoresist after the above-described process.

DESCRIPTION OF THE PREFERRED EMBODIMENTS

Figure 1A:
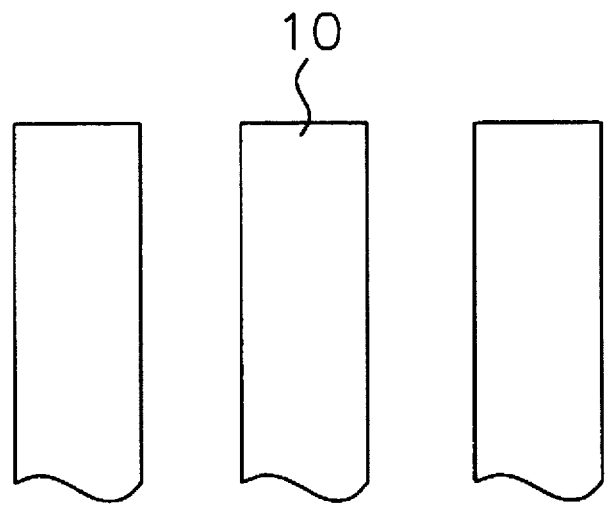
FIGS. 1 (A) and 1 (B) are a plane figure and a sectional view, respectively, of the ITO pattern structure of a liquid crystal display in prior art.
Figure 1B:
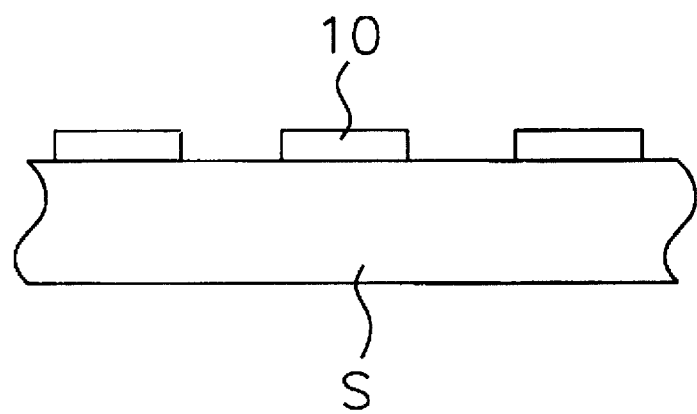
Figure 2A:
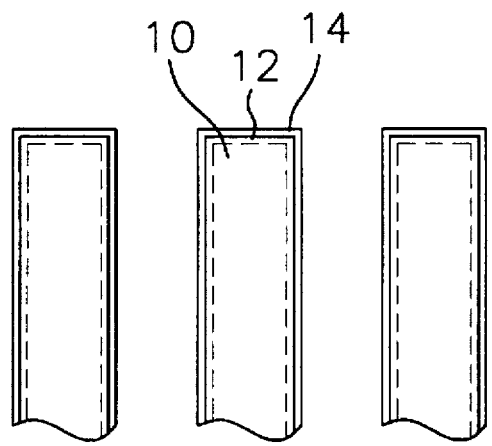
FIG. 2 (A) is a plane figure and FIGS. 2 (B) and (C) are sectional views of the ITO pattern structure of a liquid crystal display in the present invention.
Figure 2B:
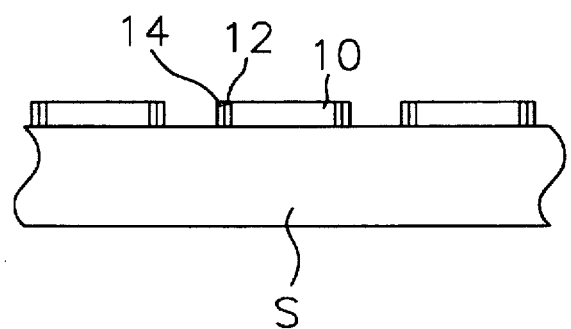
Figure 2C:
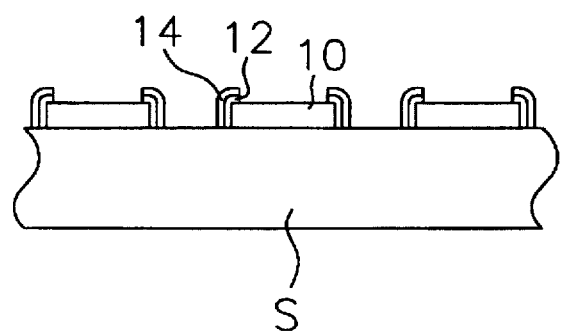

In connection with an embodiment shown in FIGS. 2A–2C, the present invention will be described as follows. FIGS. 2 (A) to 2 (C) are a plane figure and sectional views of the ITO pattern structure of a liquid crystal display in the present invention. Referring to these figures, the liquid crystal display with a low resistance electrode includes an ITO transparent electrode 10 formed on a glass substrate S at a predetermined distance from one another, and first and second metal layers 12, 14 are formed on both sides of the ITO transparent electrode 10.

The above-described structure is designed to lower the line resistance of the standard LCD by using electroless plating. First, a method for the liquid crystal display comprises a step of photoresist coating the whole glass substrate S comprising an ITO layer thereon. The method also comprises the steps of exposing by using a chromium mask and, developing and patterning to separate the photoresist region at a predetermined distance from one another.

Then, the ITO layer is etched to have the same pattern with the photoresist region by using the ITO etchant. As the ITO etchant cannot etch the photoresist, the other part, except the ITO layer under the photoresist, is etched at this time. So an etched glass appears outwardly.

Then, electroless Ni plating is carried out on the pattern. At this time, only the ITO layer is plated because Ni plating cannot be carried out on the glass or the photoresist. Metals for electroless plating are a kind of Ni or Au. In the present invention, Au electroless plating is carried out again on the Ni plated pattern, so Ni (12) and Au (14) are formed on both sides of the ITO layer.

By this time, Ni and Au metal layers on both sides of the ITO layer are formed as thick as the ITO layer or formed to cover up the corners of each side of the ITO layer. Ni and Al plating layers can be formed with Ni, Ni+Al or Ni+Au.

After the above-described process, the photoresist formed on the ITO layer is removed, then the liquid crystal display in this invention is completed. In this case, the quantity of Ni plating is in proportion to the time of soaking Ni plating in electroless plating solution.

In case of the B/W STN, the ITO layer has a 270 micrometer width, 2000 angstrom thickness when the line resistance is 15 ohms and leaves spaces 30 micrometer between the ITO layers. Ni and Au plating layers are 0.05 to 3 micrometer thick respectively. As a result, in the case of B/W STN LCD or upwards, the resistance of 300 ohms in normal TN and 10 to 15 ohms in STN can be lower.

As described above, Ni and Au plating layers are formed on both sides of the ITO transparent electrode, so that the line resistance by the line voltage drop of the transparent electrode can be reduced to obtain a uniform picture quality.

What is claimed is:

1. A method for producing a liquid crystal display comprising the steps of:

depositing an indium tin oxide (ITO) layer on a glass substrate;

coating a photoresist on said ITO layer;

exposing a portion of the photoresist using a chromium mask;

developing the photoresist to remove one of either the exposed portion of the photoresist or unexposed portion of the photoresist so that a photoresist pattern is formed on the ITO layer;

forming the ITO layer to have the same pattern as the photoresist pattern by using an ITO etchant and thereby forming sides on the ITO layer protected by the photoresist pattern;

forming first and second metal layers on the sides of said ITO layer protected by the photoresist pattern by first and second electrodeless plating; and removing the photoresist pattern.

2. The method of claim 1, wherein said first electroless plating is carried out by using Ni and said second electroless plating is carried out by using Au.

3. The method of claim 1 wherein said first metal layer comprises Ni and said second metal layer comprises metals and alloys selected from the group consisting of Al, Ni and Al, and Ni and Au.

4. The method of claim 3, wherein said first metal layer is Ni and said second metal layer is Al and each are 0.05 to 3 micrometers thick.

5. The method of claim 1, wherein said first and second metal layers are formed at least as thick as said ITO layer.

6. The method of claim 5 wherein said first and second metal layers are formed to cover a corner of each of said etched surfaces of the remaining ITO layer.

7. A method for producing a liquid crystal display comprising the steps of:

depositing an indium tin oxide (ITO) layer on a glass substrate;

applying a photoresist layer to said ITO glass substrate;

exposing said photoresist layer using a chromium mask to form a photoresist pattern;

developing the photoresist to expose a portion of the ITO layer;

etching the exposed portion of said ITO layer and thereby forming sides on the ITO layer;

forming first and second metal layers on the sides of the ITO layer by first and second electrodeless plating; and removing said photoresist.

8. The method of claim 7 wherein said first electroless plating is carried out by using Ni and said second electroless plating is carried out by using Au.

9. The method of claim 7, wherein said first metal layer is Ni and said second metal layer is Al and each are 0.05 to 3 micrometers thick.

10. The method of claim 7 wherein said first and second metal layers are formed at least as thick as said ITO layer.

11. The method of claim 10 wherein said first and second metal layers are formed to cover a corner of each of said etched surfaces of the remaining ITO layer.

12. The method of claim 7 wherein said first metal layer comprises Ni and said second metal layer comprises metals and alloys selected from the group consisting of Al, Ni and Al, and Ni and Au.

* * * * *